(12) United States Patent
Shokrollahi et al.

(10) Patent No.: US 9,564,994 B2
(45) Date of Patent: Feb. 7, 2017

(54) FAULT TOLERANT CHIP-TO-CHIP COMMUNICATION WITH ADVANCED VOLTAGE

(71) Applicant: Kandou Labs, S.A., Lausanne (CH)

(72) Inventors: Amin Shokrollahi, Preverenges (CH); Roger Ulrich, Schliern bei Koniz (CH)

(73) Assignee: KANDOU LABS, S.A. (CH)

( * ) Notice: Subject to any disclaimer, the term of this patent is extended or adjusted under 35 U.S.C. 154(b) by 10 days.

(21) Appl. No.: 14/498,957

(22) Filed: Sep. 26, 2014

(65) Prior Publication Data

US 2015/0092532 A1    Apr. 2, 2015

Related U.S. Application Data

(60) Provisional application No. 61/883,796, filed on Sep. 27, 2013.

(51) Int. Cl.
*H04L 1/00* (2006.01)
*H04L 1/20* (2006.01)
*H04L 1/22* (2006.01)

(52) U.S. Cl.
CPC ........... *H04L 1/0056* (2013.01); *H04L 1/0009* (2013.01); *H04L 1/0035* (2013.01)

(58) Field of Classification Search
CPC ........ H04L 1/0009; H04L 1/0035; H04L 1/22; H04L 1/0036; H04L 1/20
See application file for complete search history.

(56) References Cited

U.S. PATENT DOCUMENTS

| | | |
|---|---|---|
| 3,196,351 A | 7/1965 | Slepian |
| 3,636,463 A | 1/1972 | Ongkiehong |
| 3,939,468 A | 2/1976 | Mastin |
| 4,163,258 A | 7/1979 | Ebihara et al. |
| 4,181,967 A | 1/1980 | Nash et al. |
| 4,206,316 A | 6/1980 | Burnsweig et al. |
| 4,276,543 A | 6/1981 | Miller |
| 4,486,739 A | 12/1984 | Franaszeck et al. |

(Continued)

FOREIGN PATENT DOCUMENTS

| | | |
|---|---|---|
| CN | 101478286 | 7/2009 |
| EP | 2039221 B1 | 3/2009 |

(Continued)

OTHER PUBLICATIONS

International Search Report and Written Opinion of the International Searching Authority, mailed Nov. 5, 2012, in International Patent Application S.N. PCT/EP2012/052767, 7 pages.

(Continued)

*Primary Examiner* — Rasheed Gidado
(74) *Attorney, Agent, or Firm* — Invention Mine LLC (57) ABSTRACT

Systems and circuits are described for transmitting data over physical channels to provide a fault tolerant, high speed, low latency interface such as between a memory controller and memory devices. Communications signals are communicated over interconnection groups comprised of multiple wires, with the described encoding and decoding permitting continued communication in the presence of a wire failure within an interconnection group. An efficient distributable voltage regulator to provide communications driver power is also disclosed.

20 Claims, 6 Drawing Sheets

(56) References Cited

U.S. PATENT DOCUMENTS

| | | | |
|---|---|---|---|
| 4,499,550 | A | 2/1985 | Ray et al. |
| 4,722,084 | A * | 1/1988 | Morton ............... G11C 29/006 714/3 |
| 4,772,845 | A * | 9/1988 | Scott .................... G01R 31/024 324/540 |
| 4,774,498 | A | 9/1988 | Traa |
| 4,864,303 | A | 9/1989 | Ofek |
| 4,897,657 | A | 1/1990 | Brubaker |
| 5,053,974 | A | 10/1991 | Penz |
| 5,166,956 | A | 11/1992 | Baltus et al. |
| 5,168,509 | A | 12/1992 | Nakamura et al. |
| 5,283,761 | A | 2/1994 | Gillingham |
| 5,287,305 | A | 2/1994 | Yoshida |
| 5,311,516 | A | 5/1994 | Kuznicki |
| 5,412,689 | A | 5/1995 | Chan et al. |
| 5,449,895 | A | 9/1995 | Hecht |
| 5,459,465 | A | 10/1995 | Kagey |
| 5,511,119 | A | 4/1996 | Lechleider |
| 5,553,097 | A | 9/1996 | Dagher |
| 5,566,193 | A * | 10/1996 | Cloonan ............... H04L 1/0057 708/530 |
| 5,599,550 | A | 2/1997 | Kohlruss et al. |
| 5,659,353 | A | 8/1997 | Kostreski et al. |
| 5,727,006 | A * | 3/1998 | Dreyer .................... H04L 1/242 714/820 |
| 5,802,356 | A | 9/1998 | Gaskins |
| 5,825,808 | A | 10/1998 | Hershey et al. |
| 5,856,935 | A | 1/1999 | Moy |
| 5,875,202 | A * | 2/1999 | Venters ................. H04L 1/0057 714/752 |
| 5,945,935 | A | 8/1999 | Kusumoto |
| 5,949,060 | A * | 9/1999 | Schattschneider ... G06K 19/067 235/382 |
| 5,995,016 | A | 11/1999 | Perino |
| 6,005,895 | A | 12/1999 | Perino et al. |
| 6,084,883 | A | 7/2000 | Norrell et al. |
| 6,172,634 | B1 | 1/2001 | Leonowich et al. |
| 6,175,230 | B1 | 1/2001 | Hamblin et al. |
| 6,232,908 | B1 | 5/2001 | Nakaigawa |
| 6,278,740 | B1 * | 8/2001 | Nordyke ................. H04L 5/20 327/63 |
| 6,346,907 | B1 | 2/2002 | Dacy |
| 6,359,931 | B1 | 3/2002 | Perino et al. |
| 6,378,073 | B1 | 4/2002 | Davis |
| 6,398,359 | B1 | 6/2002 | Silverbrook |
| 6,404,820 | B1 | 6/2002 | Postol |
| 6,404,920 | B1 | 6/2002 | Postol |
| 6,417,737 | B1 | 7/2002 | Moloudi et al. |
| 6,452,420 | B1 | 9/2002 | Wong |
| 6,473,877 | B1 * | 10/2002 | Sharma ............... G11B 20/1816 714/712 |
| 6,483,828 | B1 | 11/2002 | Balachandran |
| 6,504,875 | B2 | 1/2003 | Perino et al. |
| 6,509,773 | B2 | 1/2003 | Buchwald |
| 6,556,628 | B1 | 4/2003 | Poulton et al. |
| 6,563,382 | B1 | 5/2003 | Yang et al. |
| 6,621,427 | B2 | 9/2003 | Greenstreet |
| 6,624,699 | B2 | 9/2003 | Yin |
| 6,650,638 | B1 | 11/2003 | Walker et al. |
| 6,661,355 | B2 | 12/2003 | Cornelius et al. |
| 6,766,342 | B2 | 7/2004 | Kechriotis |
| 6,839,429 | B1 | 1/2005 | Gaikwald et al. |
| 6,865,234 | B1 | 3/2005 | Agazzi |
| 6,865,236 | B1 | 3/2005 | Terry |
| 6,954,492 | B1 | 10/2005 | Williams |
| 6,990,138 | B2 | 1/2006 | Bejjani |
| 6,999,516 | B1 | 2/2006 | Rajan |
| 7,023,817 | B2 | 4/2006 | Kuffner |
| 7,053,802 | B2 | 5/2006 | Cornelius |
| 7,085,153 | B2 | 8/2006 | Ferrant et al. |
| 7,142,612 | B2 | 11/2006 | Horowitz et al. |
| 7,142,865 | B2 * | 11/2006 | Tsai ...................... H04L 1/0001 370/318 |
| 7,167,019 | B2 | 1/2007 | Broyde et al. |
| 7,180,949 | B2 | 2/2007 | Kleveland et al. |
| 7,184,483 | B2 | 2/2007 | Rajan |
| 7,335,976 | B2 | 2/2008 | Chen |
| 7,356,213 | B1 | 4/2008 | Cunningham et al. |
| 7,358,869 | B1 | 4/2008 | Chiarulli et al. |
| 7,362,130 | B2 | 4/2008 | Broyde et al. |
| 7,389,333 | B2 | 6/2008 | Moore et al. |
| 7,400,276 | B1 | 7/2008 | Sotiriadis |
| 7,428,273 | B2 | 9/2008 | Foster |
| 7,570,704 | B2 | 8/2009 | Nagarajan |
| 7,620,116 | B2 | 11/2009 | Bessios |
| 7,633,850 | B2 | 12/2009 | Ahn |
| 7,643,588 | B2 | 1/2010 | Visalli |
| 7,656,321 | B2 | 2/2010 | Wang |
| 7,697,915 | B2 | 4/2010 | Behzad |
| 7,706,524 | B2 | 4/2010 | Zerbe |
| 7,746,764 | B2 | 6/2010 | Rawlins et al. |
| 7,787,572 | B2 | 8/2010 | Scharf et al. |
| 7,841,909 | B2 | 11/2010 | Murray |
| 7,869,497 | B2 | 1/2011 | Benvenuto |
| 7,869,546 | B2 | 1/2011 | Tsai |
| 7,882,413 | B2 | 2/2011 | Chen et al. |
| 7,933,770 | B2 | 4/2011 | Kruger et al. |
| 8,064,535 | B2 | 11/2011 | Wiley |
| 8,091,006 | B2 | 1/2012 | Prasad et al. |
| 8,106,806 | B2 | 1/2012 | Toyomura |
| 8,149,906 | B2 | 4/2012 | Saito |
| 8,159,375 | B2 | 4/2012 | Abbasafar |
| 8,159,376 | B2 | 4/2012 | Abbasfar |
| 8,199,849 | B2 | 6/2012 | Oh |
| 8,253,454 | B2 | 8/2012 | Lin |
| 8,279,094 | B2 | 10/2012 | Abbasfar |
| 8,295,250 | B2 | 10/2012 | Gorokhov |
| 8,310,389 | B1 | 11/2012 | Chui |
| 8,406,315 | B2 | 3/2013 | Tsai |
| 8,429,495 | B2 | 4/2013 | Przybylski |
| 8,442,099 | B1 | 5/2013 | Sederat |
| 8,442,210 | B2 | 5/2013 | Zerbe |
| 8,443,223 | B2 | 5/2013 | Abbasfar |
| 8,462,891 | B2 | 6/2013 | Kizer et al. |
| 8,498,368 | B1 | 7/2013 | Husted |
| 8,520,493 | B2 | 8/2013 | Goulahsen |
| 8,547,272 | B2 | 10/2013 | Nestler et al. |
| 8,578,246 | B2 | 11/2013 | Mittelholzer |
| 8,588,280 | B2 | 11/2013 | Oh et al. |
| 8,593,305 | B1 | 11/2013 | Tajalli et al. |
| 8,638,241 | B2 | 1/2014 | Sudhakaran |
| 8,649,460 | B2 | 2/2014 | Ware et al. |
| 8,649,556 | B2 | 2/2014 | Cronie |
| 8,718,184 | B1 | 5/2014 | Cronie |
| 8,780,687 | B2 | 7/2014 | Clausen |
| 8,782,578 | B2 | 7/2014 | Tell |
| 8,879,660 | B1 | 11/2014 | Peng |
| 8,949,693 | B2 | 2/2015 | Ordentlich |
| 8,951,072 | B2 | 2/2015 | Hashim |
| 8,989,317 | B1 | 3/2015 | Holden |
| 9,036,764 | B1 | 5/2015 | Hossain |
| 9,069,995 | B1 | 6/2015 | Cronie |
| 9,077,386 | B1 | 7/2015 | Holden |
| 9,093,791 | B2 | 7/2015 | Liang |
| 9,100,232 | B1 | 8/2015 | Hormati |
| 9,281,785 | B2 | 3/2016 | Sjoland |
| 9,331,962 | B2 | 5/2016 | Lida |
| 9,362,974 | B2 | 6/2016 | Fox |
| 9,374,250 | B1 | 6/2016 | Musah |
| 2001/0055344 | A1 | 12/2001 | Lee et al. |
| 2002/0034191 | A1 | 3/2002 | Shattil |
| 2002/0044316 | A1 | 4/2002 | Myers |
| 2002/0057592 | A1 | 5/2002 | Robb |
| 2002/0154633 | A1 | 10/2002 | Shin |
| 2002/0163881 | A1 * | 11/2002 | Dhong ............... G06F 11/2007 370/225 |
| 2002/0174373 | A1 | 11/2002 | Chang |
| 2003/0071745 | A1 | 4/2003 | Greenstreet |
| 2003/0086366 | A1 | 5/2003 | Branlund |
| 2003/0105908 | A1 | 6/2003 | Perino et al. |
| 2003/0146783 | A1 | 8/2003 | Bandy et al. |
| 2003/0227841 | A1 | 12/2003 | Tateishi et al. |

(56) References Cited

U.S. PATENT DOCUMENTS

| | | | |
|---|---|---|---|
| 2004/0003336 A1* | 1/2004 | Cypher | G11C 29/42 714/763 |
| 2004/0003337 A1* | 1/2004 | Cypher | G11C 29/42 714/763 |
| 2004/0057525 A1 | 3/2004 | Rajan et al. | |
| 2004/0086059 A1 | 5/2004 | Eroz et al. | |
| 2004/0156432 A1 | 8/2004 | Hidaka | |
| 2004/0170231 A1* | 9/2004 | Bessios | H04L 25/4917 375/286 |
| 2005/0057379 A1 | 3/2005 | Jansson | |
| 2005/0135182 A1 | 6/2005 | Perino et al. | |
| 2005/0149833 A1 | 7/2005 | Worley | |
| 2005/0152385 A1 | 7/2005 | Cioffi | |
| 2005/0174841 A1 | 8/2005 | Ho | |
| 2005/0286643 A1 | 12/2005 | Ozawa et al. | |
| 2006/0115027 A1 | 6/2006 | Srebranig | |
| 2006/0159005 A1 | 7/2006 | Rawlins et al. | |
| 2007/0188367 A1 | 8/2007 | Yamada | |
| 2007/0260965 A1 | 11/2007 | Schmidt et al. | |
| 2007/0263711 A1 | 11/2007 | Kramer et al. | |
| 2007/0265533 A1 | 11/2007 | Tran | |
| 2007/0283210 A1 | 12/2007 | Prasad et al. | |
| 2008/0104374 A1 | 5/2008 | Mohamed | |
| 2008/0159448 A1 | 7/2008 | Anim-Appiah et al. | |
| 2008/0169846 A1 | 7/2008 | Lan et al. | |
| 2008/0273623 A1 | 11/2008 | Chung et al. | |
| 2008/0284524 A1* | 11/2008 | Kushiyama | H03L 7/0893 331/10 |
| 2009/0059782 A1 | 3/2009 | Cole | |
| 2009/0092196 A1 | 4/2009 | Okunev | |
| 2009/0132758 A1 | 5/2009 | Jiang | |
| 2009/0141827 A1* | 6/2009 | Saito | G11C 29/025 375/295 |
| 2009/0154500 A1 | 6/2009 | Diab et al. | |
| 2009/0164612 A1 | 6/2009 | Lee et al. | |
| 2009/0185636 A1 | 7/2009 | Palotai et al. | |
| 2009/0193159 A1 | 7/2009 | Li | |
| 2009/0212861 A1 | 8/2009 | Lim et al. | |
| 2009/0228767 A1 | 9/2009 | Oh et al. | |
| 2009/0257542 A1 | 10/2009 | Evans et al. | |
| 2010/0023838 A1 | 1/2010 | Shen | |
| 2010/0104047 A1 | 4/2010 | Chen et al. | |
| 2010/0180143 A1 | 7/2010 | Ware et al. | |
| 2010/0205506 A1 | 8/2010 | Hara | |
| 2010/0296550 A1 | 11/2010 | Abou Rjeily | |
| 2010/0296556 A1 | 11/2010 | Rave | |
| 2011/0051854 A1 | 3/2011 | Kizer et al. | |
| 2011/0072330 A1 | 3/2011 | Kolze | |
| 2011/0084737 A1 | 4/2011 | Oh et al. | |
| 2011/0127990 A1 | 6/2011 | Wilson et al. | |
| 2011/0235501 A1 | 9/2011 | Goulahsen | |
| 2011/0268225 A1* | 11/2011 | Cronie | H04L 25/4906 375/296 |
| 2011/0299555 A1 | 12/2011 | Cronie et al. | |
| 2011/0302478 A1 | 12/2011 | Cronie | |
| 2011/0317559 A1 | 12/2011 | Kern et al. | |
| 2012/0063291 A1 | 3/2012 | Hsueh | |
| 2012/0152901 A1 | 6/2012 | Nagorny | |
| 2012/0161945 A1* | 6/2012 | Single | A61N 1/36189 340/12.1 |
| 2012/0213299 A1 | 8/2012 | Cronie et al. | |
| 2013/0010892 A1 | 1/2013 | Cronie et al. | |
| 2013/0051162 A1 | 2/2013 | Amirkhany et al. | |
| 2014/0226455 A1 | 8/2014 | Schumacher | |
| 2014/0254730 A1 | 9/2014 | Kim et al. | |
| 2015/0010044 A1 | 1/2015 | Zhang | |
| 2015/0078479 A1 | 3/2015 | Whitby-Strevens | |
| 2015/0333940 A1 | 11/2015 | Shokrollahi | |
| 2015/0381232 A1 | 12/2015 | Ulrich | |
| 2016/0020796 A1 | 1/2016 | Hormati | |
| 2016/0020824 A1 | 1/2016 | Ulrich | |
| 2016/0036616 A1 | 2/2016 | Holden | |

FOREIGN PATENT DOCUMENTS

| | | |
|---|---|---|
| JP | 2003163612 | 6/2003 |
| WO | 2009084121 | 7/2009 |
| WO | 2010031824 | 3/2010 |
| WO | 2011119359 | 9/2011 |

OTHER PUBLICATIONS

International Search Report and Written Opinion of the International Searching Authority, mailed Jul. 14, 2011 in International Patent Application S.N. PCT/EP2011/002170, 10 pages.

Healey, A., et al., "A Comparison of 25 Gbps NRZ & PAM-4 Modulation used in Legacy & Premium Backplane Channels", DesignCon 2012, 16 pages.

International Search Report for PCT/US2014/053563, dated Nov. 11, 2014, 2 pages.

Clayton, P., "Introduction to Electromagnetic Compatibility", Wiley-Interscience, 2006.

She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.

Poulton, et al., "Multiwire Differential Signaling", UNC-CH Department of Computer Science Version 1.1, Aug. 6, 2003.

Skliar et al., A Method for the Analysis of Signals: the Square-Wave Method, Mar. 2008, Revista de Matematica: Teoria y Aplicationes, pp. 09-129.

International Search Report and Written Opinion from PCT/US2014/034220 mailed Aug. 21, 2014.

International Search Report and Written Opinion for PCT/US14/052986 mailed Nov. 24, 2014.

Burr, "Spherical Codes for M-ARY Code Shift Keying", University of York, Apr. 2, 1989, pp. 67-72, United Kingdom.

Slepian, D., "Premutation Modulation", IEEE, vol. 52, No. 3, Mar. 1965, pp. 228-236.

Stan, M., et al., "Bus-Invert Coding for Low-Power I/O, IEEE Transactions on Very Large Scale Integration (VLSI) Systems", vol. 3, No. 1, Mar. 1995, pp. 49-58.

Tallani, L., et al., "Transmission Time Analysis for the Parallel Asynchronous Communication Scheme", IEEE Tranactions on Computers, vol. 52, No. 5, May 2003, pp. 558-571.

International Search Report and Written Opinion for PCT/EP2012/052767 mailed May 11, 2012.

International Search Report and Written Opinion for PCT/EP2011/059279 mailed Sep. 22, 2011.

International Search Report and Written Opinion for PCT/EP2011/074219 mailed Jul. 4, 2012.

Notification of Transmittal of the International Search Report and the Written Opinion of the International Searching Authority, or the Declaration for PCT/EP2013/002681, dated Feb. 25, 2014, 15 pages.

Ericson, T., et al., "Spherical Codes Generated by Binary Partitions of Symmetric Pointsets", IEEE Transactions on Information Theory, vol. 41, No. 1, Jan. 1995, pp. 107-129.

Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.

Abbasfar, A., "Generalized Differential Vector Signaling", IEEE International Conference on Communications, ICC '09, (Jun. 14, 2009), pp. 1-5.

Dasilva et al., "Multicarrier Orthogonal CDMA Signals for Quasi-Synchronous Communication Systems", IEEE Journal on Selected Areas in Communications, vol. 12, No. 5 (Jun. 1, 1994), pp. 842-852.

Wang et al., "Applying CDMA Technique to Network-on-Chip", IEEE Transactions on Very Large Scale Integration (VLSI) Systems, vol. 15, No. 10 (Oct. 1, 2007), pp. 1091-1100.

Cheng, W., "Memory Bus Encoding for Low Power: A Tutorial", Quality Electronic Design, IEEE, International Symposium on Mar. 26-28, 2001, pp. 199-204, Piscataway, NJ.

(56) References Cited

OTHER PUBLICATIONS

Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/tcomm.2003.822168, pp. 55-59.

Notification of Transmittal of International Search Report and the Written Opinion of the International Searching Authority, for PCT/US2015/018363, mailed Jun. 18, 2015, 13 pages.

Counts, L., et al., "One-Chip Slide Rule Works with Logs, Antilogs for Real-Time Processing," Analog Devices Computational Products 6, Reprinted from Electronic Design, May 2, 1985, 7 pages.

Design Brief 208 Using the Anadigm Multiplier CAM, Copyright 2002 Anadigm, 6 pages.

Grahame, J., "Vintage Analog Computer Kits," posted on Aug. 25, 2006 in Classic Computing, 2 pages, http.//www.retrothing.com/2006/08/classic_analog_.html.

Schneider, J., et al., "ELEC301 Project: Building an Analog Computer," Dec. 19, 1999, 8 pages, http://www.clear.rice.edu/elec301/Projects99/anlgcomp/.

Tierney, J., et al., "A digital frequency synthesizer," Audio and Electroacoustics, IEEE Transactions, Mar. 1971, pp. 48-57, vol. 19, Issue 1, 1 page Abstract from http://ieeexplore.

"Introduction to: Analog Computers and the DSPACE System," Course Material ECE 5230 Spring 2008, Utah State University, www.coursehero.com, 12 pages.

Notification of Transmittal of the International Search Report and the Written Opinion of the International Searching Authority, or the Declaration, for PCT/US2014/015840, dated May 20, 2014. 11 pages.

Notification of Transmittal of the International Search Report and the Written Opinion of the International Searching Authority, or the Declaration, for PCT/US2014/043965, dated Oct. 22, 2014, 10 pages.

Notification of Transmittal of the International Search Report and the Written Opinion of the International Searching Authority, or the Declaration, dated Mar. 3, 2015, for PCT/US2014/066893, 9 pages.

International Preliminary Report on Patentability for PCT/US2014/015840, dated Aug. 11, 2015, 7 pages.

Jiang, A., et al., "Rank Modulation for Flash Memories", IEEE Transactions of Information Theory, Jun. 2006, vol. 55, No. 6, pp. 2659-2673.

Zouhair Ben-Neticha et al, "The streTched-Golay and other codes for high-SNR finite-delay quantization of the Gaussian source at 1/2 Bit per sample", IEEE Transactions on Communications, vol. 38, No. 12 Dec. 1, 1990, pp. 2089-2093, XP000203339, ISSN: 0090-6678, DOI: 10.1109/26.64647.

Oh, et al., Pseudo-Differential Vector Signaling for Noise Reduction in Single-Ended Signaling, DesignCon 2009.

\* cited by examiner

FAULT TOLERANT CHIP-TO-CHIP COMMUNICATION WITH ADVANCED VOLTAGE

CROSS REFERENCES

This application claims priority to U.S. provisional application Ser. No. 61/883,796 entitled "Fault Tolerant Chip-To-Chip Communication With Advanced Voltage Regulator" filed Sep. 27, 2013, the entire contents of which are incorporated by reference herein. The following references are herein incorporated by reference in their entirety for all purposes:

U.S. Patent Publication 2011/0268225 of U.S. patent application Ser. No. 12/784,414, filed May 20, 2010, naming Harm Cronie and Amin Shokrollahi, entitled "Orthogonal Differential Vector Signaling" (hereinafter "Cronie I");

U.S. Patent Publication 2011/0302478 of U.S. patent application Ser. No. 12/982,777, filed Dec. 30, 2010, naming Harm Cronie and Amin Shokrollahi, entitled "Power and Pin Efficient Chip-to-Chip Communications with Common-Mode Resilience and SSO Resilience" (hereinafter "Cronie II");

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes" (hereinafter "Cronie III"); and U.S. patent application Ser. No. 13/463,742, filed May 3, 2012, naming Harm Cronie and Amin Shokrollahi, entitled "Finite State Encoders and Decoders for Vector Signaling Codes" (hereafter called "Cronie IV").

U.S. patent application Ser. No. 13/603,107, filed Sep. 9, 2012, naming Brian Holden and Amin Shokrollahi, entitled "Methods and Systems for Selection of Unions of Vector Signaling Codes for Power and Pin Efficient Chip-To-Chip Communication" (hereinafter called "Holden I").

U.S. patent application Ser. No. 13/671,426, filed Nov. 7, 2012, naming Brian Holden and Amin Shokrollahi, entitled "Crossbar Switch Decoder for Vector Signaling Codes" (hereinafter called "Holden II").

BACKGROUND

In communication systems, information may be transmitted from one physical location to another. Furthermore, it is typically desirable that the transport of this information is reliable, is fast and consumes a minimal amount of resources.

Vector signaling is a method of signaling. With vector signaling, pluralities of signals on a plurality of wires are considered collectively although each of the plurality of signals may be independent. Each of the collective signals is referred to as a component and the number of plurality of wires is referred to as the "dimension" of the vector. In some embodiments, the signal on one wire is entirely dependent on the signal on another wire, as is the case with differential signaling pairs, so in some cases the dimension of the vector may refer to the number of degrees of freedom of signals on the plurality of wires instead of the number of wires in the plurality of wires.

With binary vector signaling, each component takes on a coordinate value (or "coordinate", for short) that is one of two possible values. As an example, eight single ended signaling wires may be considered collectively, with each component/wire taking on one of two values each signal period. A "code word" of this binary vector signaling is one of the possible states of that collective set of components/wires. A "vector signaling code" or "vector signaling vector set" is the collection of valid possible code words for a given vector signaling encoding scheme. A "binary vector signaling code" refers to a mapping and/or set of rules to map information bits to binary vectors.

With non-binary vector signaling, each component has a coordinate value that is a selection from a set of more than two possible values. A "non-binary vector signaling code" refers to a mapping and/or set of rules to map information bits to non-binary vectors.

Examples of vector signaling methods are described in Cronie I, Cronie II, Cronie III, and Cronie IV.

Signaling using a plurality of wires that change state simultaneously may be associated with undesirable secondary effects within the output circuit, due to the physical need to change the output level on multiple wire loads. The resulting anomalous noise, caused by this current draw from power sources and/or current drain into ground lines and/or power returns, is known as Simultaneous Switched Output noise or SSO.

BRIEF SUMMARY

In accordance with at least one embodiment, processes and apparatuses provide for transmitting data over physical channels comprising groups of wires to provide a high speed, low latency communications interface, even in the presence of a wire failure within a channel group. In the general case, N bits are transmitted over M wires in such a way that failure of any K-of-M wires does not lead to a reduction of throughput or data error.

In at least one embodiment, an external mechanism is used to identify wire failures and so notify the communications system.

One example embodiment describes a channel interface between a memory controller and one or more memory devices, which delivers at least the same throughput as a single-ended solution with significantly less SSO and reduced power utilization, without requiring additional pin count or significantly increased transfer latency. Controller-side and memory-side embodiments of such channel interfaces are disclosed. In some embodiments, different voltage, current, etc. levels are used for signaling and more than two levels may be used, such as a vector signaling code wherein each wire signal may take on any of three, four, or more values.

This Brief Summary is provided to introduce a selection of embodiments in a simplified form that are further described below in the Detailed Description. This Brief Summary is not intended to identify key or essential features of the claimed subject matter, nor is it intended to be used as an aid in determining the scope of the claimed subject matter. Other objects and/or advantages will be apparent to one of ordinary skill in the art upon review of the Detailed Description and the included drawings.

BRIEF DESCRIPTION OF THE DRAWINGS

Various embodiments in accordance with the present disclosure will be described with reference to the drawings. Same numbers are used throughout the disclosure and figures to reference like components and features.

DETAILED DESCRIPTION

Specialized memory subsystems of modern computer systems utilize dedicated memory controllers to manage access, optimize performance, and improve utilization and reliability. Interconnections between these memory controllers and memory devices must operate at high speeds, delivering reliable and low latency data transfers, while under significant constraints in terms of available pin count and power utilization.

Figure 6:
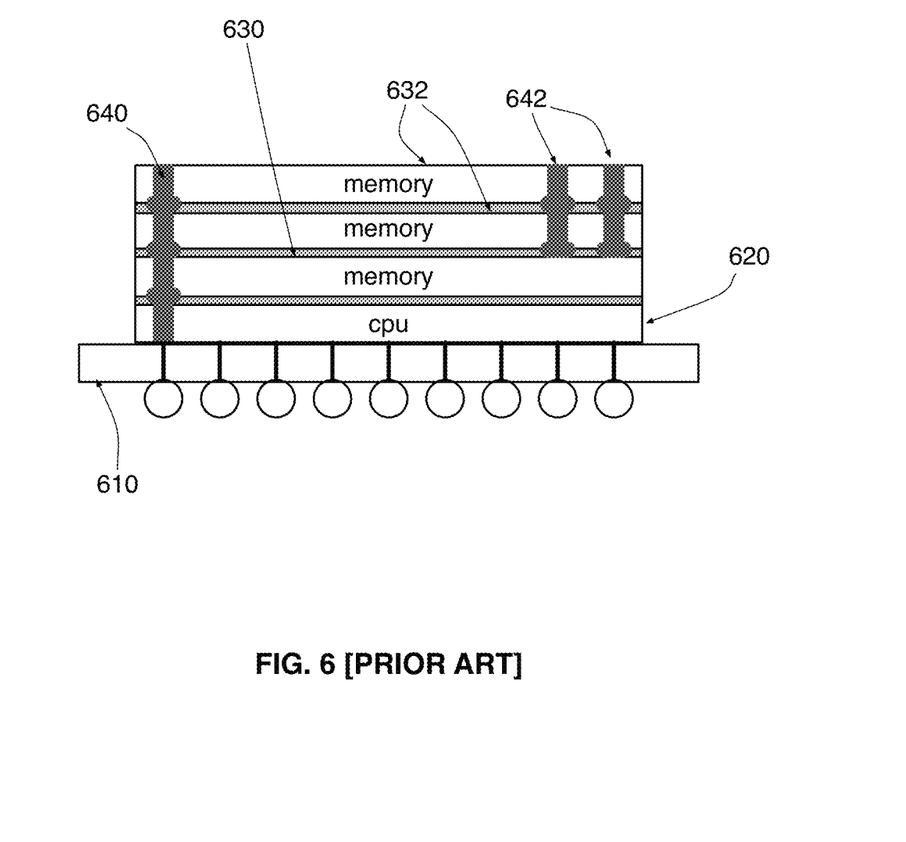
FIG. 6 illustrates a prior art assembly of stacked integrated circuit devices interconnected by Through-Silicon-Via (TSV) connections.

One known technology to combine multiple dies into a single package is the use of through-silicon vias ("TSV"). FIG. 6 shows an example of a package 610 on which a processor die 620 is mounted. Memory dies 630, 632 are mounted on top of the processor die 620. The conductive connection between processor die 620 and memory dies 630, 632 is made with TSV 640. Memory die 630 is connected to memory dies 632 by TSVs 642 (and also by TSV 640 in some cases). One advantage of through-silicon vias is that the path between processor die 420 and the memory dies is substantially shortened.

The use of through-silicon vias is known to have several disadvantages. First, the cost of the process to make through-silicon vias is very high, and the complexity of the process is such that it is very difficult to obtain high production yields. Second, there is low tolerance to misalignments of the individual dies. Third, such a direct non-flexible mechanical connection between dies will undergo shear stress when the two dies undergo differential thermal expansion, possibly to the point of destruction.

These factors may result in higher than desirable system failure rates, as one or more TSV connections fail to provide a signal path between system components. Thus, communications solutions that provide even modest immunity to communications path failures may provide significantly reduced system failure rates.

In accordance with at least one embodiment of the invention, several classes of codes are presented, their properties investigated, and example embodiments of encoders and decoders described.

Various embodiments described herein exhibit one or more of the following characteristics:

Implementable in both high-speed logic and memory device processes

Consume very low power for the encoder, driver, receiver, and decoder

Reduce (or entirely eliminate) SSO when compared to single ended signaling

The Fault-Tolerant solutions described also exhibit the characteristic of allowing operation in the presence of a failed interconnection wire.

The described solutions utilize prior knowledge of failed communication path elements, such as a wire failure detected as part of an initial test procedure and subsequently treated as failed by the communications system. This approach is distinct in design and operation from that of known Error-Correcting Codes (ECC) that incorporate parity or other data redundancy to allow corrupted communication data to be recovered. It is well known by those familiar with the art that the error-recovery decoding of ECC is both complex and lengthy, and thus poorly suited to the primary signal path for high speed data transmitted over circuits with known and persistent partial failures.

A number of codes are described for which the encoder and decoder have very small footprint. In applications of primary interest to this document, the communication channel between the sender and the receiver has very low insertion loss, and therefore hardly experiences noise caused by ISI, insertion loss, reference noise, or thermal noise. On the other hand, SSO causes a large amount of noise because of the relatively large size of the bus. Embodiments described herein may therefore trade off immunity to common mode and reference noise in some of examples to further reduce the size and hence the power consumption of the encoding and decoding circuitry used by the system.

General Assumptions

For purposes of comparison and without limitation, a reference interface design is assumed to use single-ended CMOS drivers to drive extremely short non-terminated bussed or point-to-point interconnections. Inter-symbol interference and transmission line loss are considered to be small or negligible for the example use, and reference noise and thermal noise are considered to be tractable.

Figure 1A:
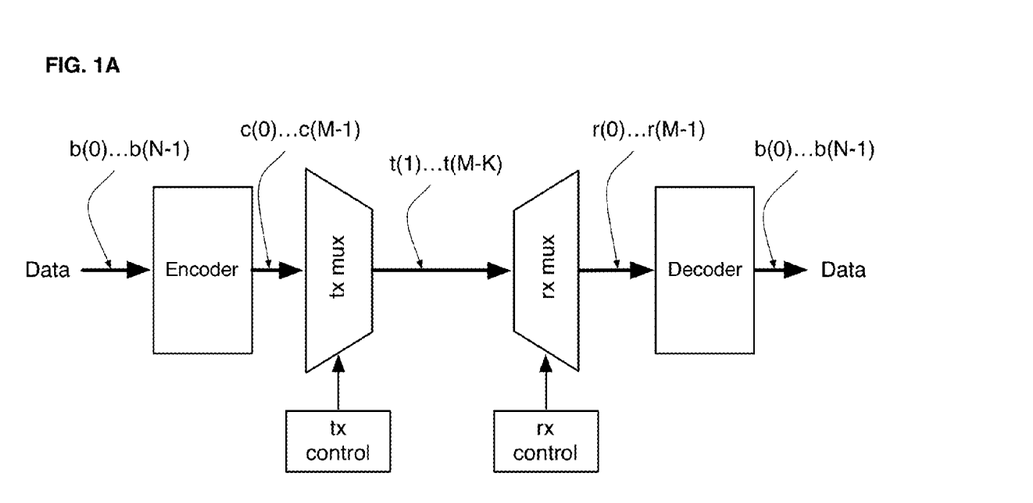
FIG. 1A illustrates a system embodiment for a communications interface using fault-tolerant vector signaling codes.

Similarly, for purposes of description and without limitation, examples describing a particular physical interface width will assume data transfer occurs over fixed size groups of signal wires, TSV connections, bond wires, or pins, which may be subsets of the overall interconnection, although the described solutions may be equally well applied to both narrower and wider interfaces. The various examples presented herein utilize group or ensemble encoding, also known as a vector signaling code as illustrated generically in FIG. 1A, encoding N bits of information which is then transmitted over M wires in such a way that failure of any K-of-M wires does not lead to a reduction of throughput or data error.

Figure 1B:
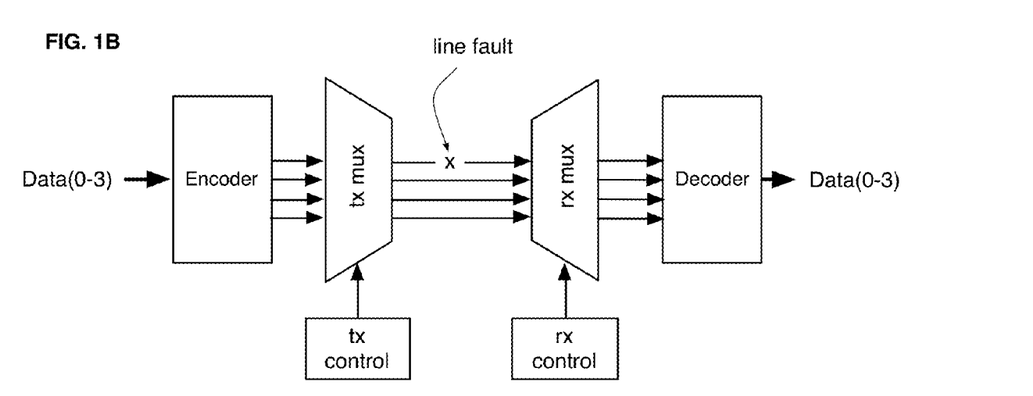
FIG. 1B illustrates a specific embodiment using four wires to communicate four bits of data with tolerance of one wire failure.

As one example provided for illustration and without limitation, FIG. 1B shows four bits of Data(0-3) being encoded into four vector signaling code symbols which are transmitted over a four wire interconnection, here shown as having one failed wire. The received symbols are detected and successfully decoded into four bits of received Data(0-3). At least one embodiment utilizes an external mechanism, illustrated as "tx control" and "rx control", to identify wire failures which are adaptively corrected by the communications system, here shown as being performed by the elements "tx mux" and "rx mux." Other embodiments may combine the illustrated elements, as examples combining encoder and tx mux into a redundant code encoder, and rx mux and decoder into a fault-tolerant receiver and decoder, as will be understood by one familiar with the art.

Each described embodiment offers different degrees of fault immunity, SSO reduction and/or power consumption. In accordance with at least one embodiment, signaling using three or more distinct signal levels may be used. As one example, an output driver for a three level or ternary signaling method is shown in the circuit diagram of FIG. 2A. Based on these examples, a knowledgeable practitioner may extend the described embodiments to embodiments conveying more than 3 signal levels per wire.

Ternary Levels

In accordance with at least one embodiment, three distinct output levels may be transmitted on every transmission wire, in a "ternary coding" scheme. The coordinate levels of the ternary code correspond to voltage levels on the wires, which in turn depend on the Vdd of the system and the swing of the signals. To permit a voltage-independent description allowing fair comparison to single-ended signaling, the descriptions assume that:

For full-swing Single-Ended (SE) binary signaling, the voltage level multipliers are 0 and 1 (i.e., the voltage levels correspond to 0*Vdd (which is typically equal to Vss) and 1*Vdd)

For Full-Swing ternary coding, the voltage level multipliers are 0, ½, and 1, corresponding to signal levels of Vss, ½ Vdd, and Vdd.

For each described coding scheme, we will compare the performance against that of single-ended signaling. Both SSO and power consumption will be described by a single number. For the power consumption, this number has to be compared against ¼, which is the average per wire power consumption of single-ended signaling. For the worst case SSO, our numbers are to be compared against 1, which is the worst case SSO of single-ended signaling.

The multipliers used as examples are taken for purposes of descriptive clarity. Some embodiments of the invention may rely on other multiplier factors of Vdd or equivalent absolute signal levels satisfying the same signal identification purpose. As examples, one embodiment of reduced swing (RS) ternary signaling may use coordinates of ¼ Vdd, ½ Vdd, ¾ Vdd, and another embodiment may use coordinates of 0 V, 300 mV, and 600 mV, each representing three distinct coordinate values spanning a range less than that of a full-swing CMOS binary signal.

Similarly, embodiments utilizing quaternary or higher-ordered signaling may define four (or more) levels extending across the entire Vdd to Vss span to create a full-swing signaling scheme, or may define such levels contained within a smaller overall span, creating a reduced-swing signaling scheme.

Line States

For simplicity in the description of coding algorithms later in the disclosure, the two binary states are designated 0 & 1 and the three ternary states as 0, 1, & 2. These descriptive identifiers for the states are independent of the voltage level multipliers described above that are used to transmit them.

Driver Power Consumption

In the case of a non-terminated CMOS driver, the main power drawn from the Vdd or positive supply rail is consumed in changing the voltage on the primarily capacitive load of the output line when the driver makes a transition from a lower state to a higher state. For a given load, the amount of consumed power is proportional to the magnitude of the transition. Stated differently, when transitioning from a state $(x1, \ldots, xk)$ to a following state $(y1, \ldots, yk)$ the driver power on k wires is proportional to the sum $\max(x1-y1, 0)+ \ldots +\max(xk-yk, 0)$. This is independent of the particular reference chosen since the reference is canceled by taking differences. The power consumed by single-ended signals on k wires is between 0 and k, and the average power is k/4 since on a single wire a power consumption of 1 occurs only when transitioning from a 0 to a 1.

A similar calculation may be made to assess the power dissipated (or alternatively, the current injected into the Vss or ground rail) in changing the voltage on the primarily capacitive load of the output line when the driver makes a transition from a higher state to a lower state. In some embodiments, this flow of Vss or ground current may be as significant a design factor as the current drawn from the Vdd or supply rail.

Additional Driver Considerations

A conventional embodiment of a binary output driver is based on a CMOS inverter structure, where a totem pole pair of transistors is used to source current from the Vdd or positive supply rail to the output pin, or conversely sink current from the output pin to the Vss or ground rail. Use of dedicated output driver power rails is known, either for purposes of noise isolation, or to allow the I/O to operate at different or distinct voltage levels compared to the main logic and/or memory systems. Cascaded chains of inverters are commonly used, with the transistors at each stage being scaled up in size and current capability from the extremely low node capacitance and current demands of an internal circuit node, to the relatively massive capacitance and proportionately large current demands of the actual output pin and external load.

Figure 2A:
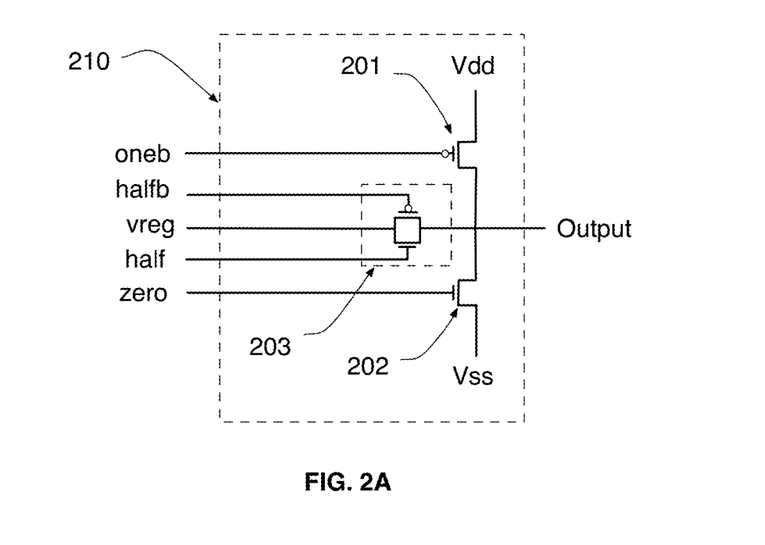
FIG. 2A shows a circuit diagram of one embodiment of a ternary output driver, and as FIG.

In accordance with at least one embodiment, output drivers for ternary or higher-ordered output levels add additional intermediate voltage elements to the binary driver's source and sink transistor. As shown in FIG. 2A, such intermediary-level outputs may be based on a CMOS transmission gate structure 203 connecting an intermediate voltage rail vreg to the Output pin.

Regulated Mid-Rail Voltage

At least one embodiment generates the required intermediate output voltage for the ternary drivers on-chip. A conventional linear regulator design such as shown as 220 in FIG. 2B may supply multiple drivers 210. Resistors 230 and 240 are used to set a reference voltage level that is buffered by analog amplifier 250 and bypass capacitor 260 to provide reference voltage vref.

Figure 2B:
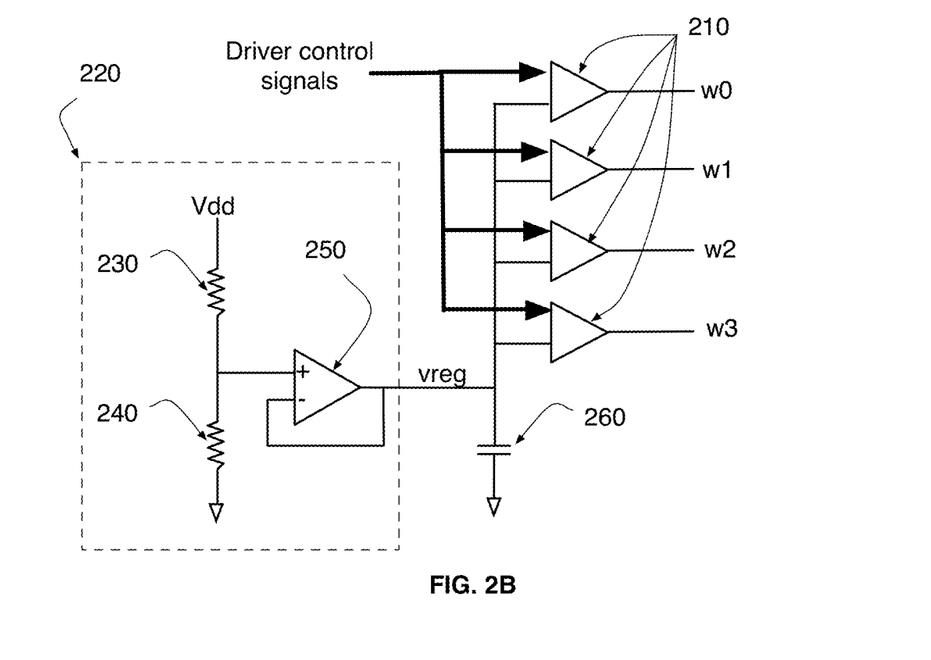
FIG. 2B shows a circuit diagram including a regulator supplying the regulated voltage it uses for its third output level.

As is well understood by one familiar with the art, the analog amplifier 250 of FIG. 2B represents a considerable source of power consumption in a practical design. An amplifier design incorporating a purely Class A output stage will be fast and simple, but most inefficient. A similar design with a class AB output stage will draw less quiescent current, but will also have a slower response time. Two-stage designs combining Class A and Class AB output stages will be more efficient, but also more complex.

In some embodiments, a single source of regulated voltage may be shared by multiple chips. One such example is a stacked memory configuration with a voltage regulator on a controller chip also supplying regulated voltage to one or more memory chips. Further embodiments may incorporate additional bypass capacitance and/or additional regulator elements within such secondary chips, to augment or assist the voltage regulation provided by the primary or controller chip.

Adaptive Power Regulator

As previously described, the load a CMOS driver imposes on its power source is the result of charge and discharge of the essentially capacitive wire load being driven to the desired output level. Thus, a power regulator that is aware of the transmitted data pattern may anticipate power demand by changing its sink and source characteristics dependent on the data to be output.

FIG. 3A shows one embodiment of the logic required to drive a single output wire with ternary data. Inputs (a, b) represent an encoding of the three necessary levels as two binary bits, which are then decoded by simple logic into separate signals "one", "half", and "zero", and their compliments. (These signals may be seen controlling the ternary output driver 210 of FIG. 2A.) Additional logic identifies transitions from a previous one or zero output state to the half state (that is, from ternary state '0' or '2' to ternary state '1',) producing the additional signals "godownhalf", "gouphalf" and their compliments. These additional signals control the charge pump of FIG. 3B, causing increments of charge to be transferred between the vreg line and one of capacitors Cup and Cdown. Thus, a relatively modest baseline capacity of analog regulator 220 to sink or source current may be augmented by the data-dependent or adaptive power regulator.

Further embodiments may include the control logic of FIG. 3A and the charge pump of FIG. 3B with each ternary output driver, thus scaling the augmentation proportionately with the demand. Embodiments sharing the regulated voltage across multiple chips may include such local augmentation on each ternary output driver of each chip, while sharing a baseline regulator across all devices. Other embodiments may utilize different ratios of control logic and charge pumps, such as one larger charge pump controlled by logic monitoring multiple output drivers.

Still other embodiments may incorporate direct measurement of the intermediate voltage to provide additional control signals for the charge pump to raise or lower the intermediate voltage. One embodiment incorporates multiple pump capacitors, allowing different increments of charge transfer to be performed as required. Further embodiments may use such measurements to adjust the pump capacitance, duty cycle, or operational rate to optimize operation based on the actual load presented to the regulated voltage line.

It will be apparent to one familiar with the art that equivalent means may be applied to provide a source or sink of current instead of the example charge pump, as one example using controlled current sources and current sinks. As with the charge pump example, the set level for the controlled current sources and current sinks may be adjusted based on measurement of the intermediate voltage, using as examples one or more comparators, an analog to digital converter, etc.

SSO Noise

The main SSO is caused by transitions between states. The SSO noise value may be normalized to a single number in the following sense: for the SSO on k wires, the SSO caused by the transition from a state $(x1, \ldots, xk)$ on the wires to a state $(y1, \ldots, yk)$ is set to be equal to $|(x1-y1)+ \ldots +(xk-yk)|$ which in turn is equal to the absolute value of the sum of the coordinates of x minus the sum of the coordinates of y. Because a common reference is canceled through taking the difference, the SSO is independent of the reference.

For a single-ended binary system the SSO produced on 1 wire is either 0 or 1. When taking k wires, the worst case SSO is k, and it can be any number between 0 and k. Simple coding can reduce this number considerably, and even completely reducing it to zero in certain cases.

For single-ended binary signaling on k wires, the power consumption of every transition has a binomial distribution on $0, \ldots, k$ where the probability of a single event is ¼, and its average is k/4. The SSO of this signaling is also binomially distributed and the worst case SSO is k.

TL3 Transition-Limiting Coding

Because it is the transitions that are important in an un-terminated CMOS driver, it makes sense to encode the information in the transitions. If the system uses binary states on the wires then it is not possible to reduce SSO and at the same time maintain full pin-efficiency, i.e., the property of transmitting one bit per clock cycle on every wire. Therefore, some described methods of reducing the SSO use ternary signaling and transition-limiting coding.

TL3 is one such code that reduces the peak SSO to just 33% of single ended.

In accordance with at least one embodiment, the TL3 encoder receives three input bits (a, b, c) and maintains a prior state $p=(p[0], p[1], p[2])$, $p_i \in \{0, 1, 2\}$ representing the output wire values in the previous output step. For each new input provided, the encoder updates state p with the algorithm:

```
If bc = 0 then,
    p[b + 2c] ← T₁(p[b + 2c], a)
else
    if a = 0 then
        p[0] ← T₂(p[0])
        p[1] ← T₂(p[1])
    endif
endif
``` using the transition tables $T_1$ and $T_2$ below. The updated p is then emitted on the output wires.

| Table $T_1$ | | |
|---|---|---|
| | 0 | 1 |
| 0 | 1 | 2 |
| 1 | 2 | 0 |
| 2 | 0 | 1 |

| Table $T_2$ | |
|---|---|
| | |
| 0 | 1 |
| 1 | 0 |
| 2 | 1 |

The corresponding TL3 decoder separately maintains a prior state p and a successor state s $p=(p[0], p[1], p[2])$, $p_i \in \{0, 1, 2\}$, $s=(s[0], s[1], s[2])$, $s_i \in \{0, 1, 2\}$ representing the remembered previous and current detected input wire values, respectively. For each new input wire values detected, the decoder performs the algorithm:

```
a := 1, b := 1, c := 1
w = (s − p) mod 3
m = weight(w)
Determine position b₀ + 2c₀ such that w[b₀ + 2c₀] ≠ 0, t ← w[b₀ + 2c₀]]
if m=1, then
    b := b₀, c := c₀, a = t − 1
else
    b := 1, c := 1
```

Figure 3:
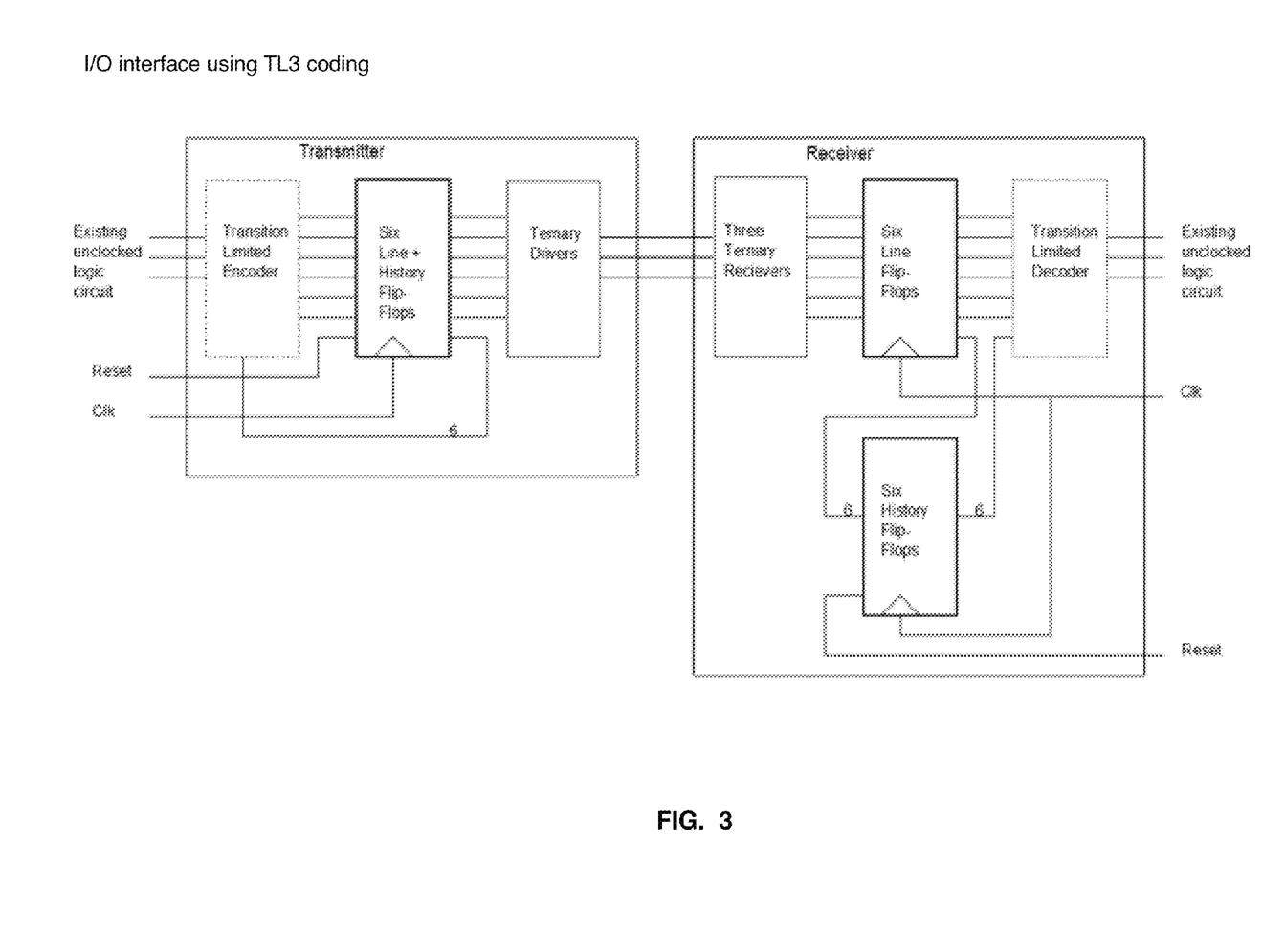
FIG. 3 is a block diagram of a communications system using the TL3 transition code.
Figure 4A:
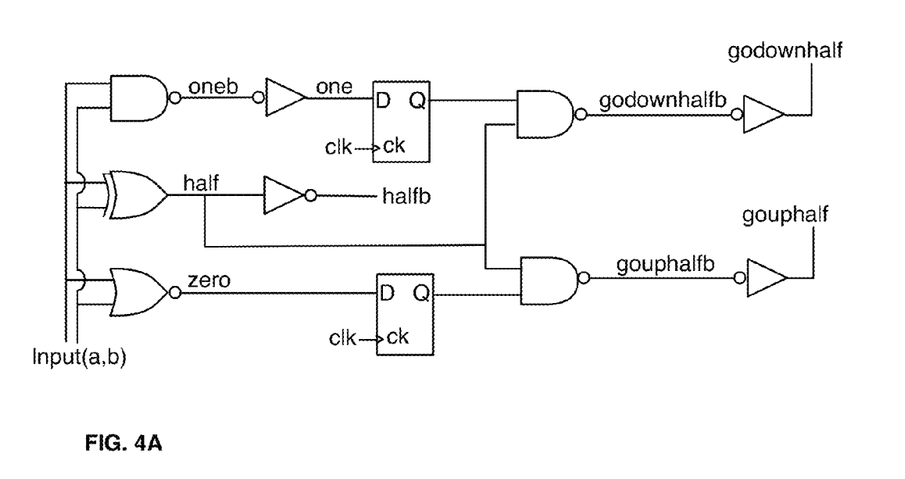
FIG. 4A illustrates one embodiment of a data-driven intermediate voltage regulator and example of data logic.
Figure 4B:
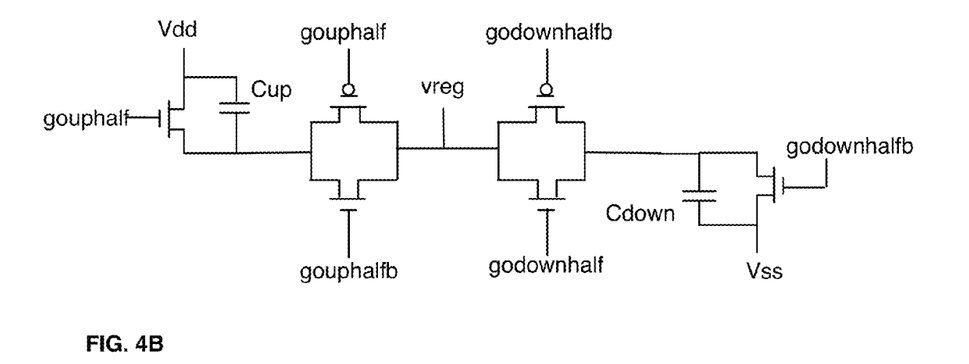
FIG. 4B illustrates an example of a charge pump controlled by data logic.

```
    if m=2, then
        a := 0
    endif
endif
``` a, b, c are output as the received data values, and stored state s is updated to be equal to p FIG. 3 shows a block diagram of an I/O interface between a transmitting chip and a receiving chip using a TL3 code. As described earlier, the actual signal levels used to represent the three ternary coordinate values is independent of the TL3 coding/decoding, thus FIG. 3 illustrates both Full-Swing and Reduced-Swing variants.

In the TL3 interface illustrated in FIG. 3, the embodiment of the history-storing element within the transmitter is shown as comprising three of the six total flip-flops following the transition-limited encoder. Other embodiments may organize the required elements in a different order providing equivalent behavior.

The receiver front end for the ternary codes used by TL3 require two comparators per wire and two reference levels, typically at the midpoints between the 0, 1 and 1, 2 signal levels. The history-storing element within the receiver is shown as comprising a set of six history flip-flops operating in parallel with the main data flow from ternary receiver to line flip-flops to transition limited decoder. Other embodiments may organize the elements in a different order providing equivalent behavior, for example, placing the decoder immediately after the ternary receivers.

Reduction of Overall Signal Swing

In accordance with at least one embodiment, the selected code may be combined with reduced signal swings to provide additional SSO reduction over the reference full-swing binary CMOS example. As one particular example, the described TL3 code may be combined with the previously described RS signal levels, to produce the TL3-RS signaling method. Other such combinations of coding methods and signal swing constraints described herein should be considered as implicitly included combinations of the described elements.

Reset of the Transition Code

Two additional related issues exist with the use of transition codes. The first issue is ensuring that the history values used at each end are coordinated when the bus is used sporadically. The second issue, discussed in the next section, is ensuring that transitions on the line are minimized when the bus is not in use.

The first issue is to ensure that the history values at each end of the bus are using the same value. For buses that are running continuously, this is not an issue because the history values are set after a single clock. For buses such as bidirectional data buses, which are used sporadically by different transmit-receive pairs, and which produce data in narrow intervals, a reset function can also be used to coordinate the value of the history function.

When a data bus is not in use, the history value in the FIR filter at each end is reset to a known value. When that data bus is used, the reset is released at the exact moment that the data becomes valid.

In applications where an address bus is encoded with the TL3 code, at least two alternative embodiments may be used. The first embodiment includes circuitry to reset the history value when the address bus is not in use. The second embodiment is configured to allow the address bus to run for a single clock at startup.

Control of the Idle Values

The second issue with the use of transition codes is to carefully control the idle values on the bus. Since one possible reason to use a transition code is to minimize the transition on the bus, it may be desirable to eliminate or reduce transitions on the bus when the bus is not in use. Many buses sit idle most of the time, so the power dissipated in these situations is significant to the overall power consumption of the system.

With transition codes, only a single specific value of the bus leads to no transitions on the bus. This is not an issue with data buses since they are held in reset as described above. Three embodiments are now described for address and control buses.

The first embodiment for address and control buses is to organize the interface between the controller and the physical bus, so that during idle periods the address or control bus produces the particular value that is encoded as no transition.

The second embodiment is to hold the address and control in reset when not in use, similar what is done for the address bus.

The third embodiment adds a bus-holder circuit to the bus interface which has extra flip-flops at the transmit end to detect whether the bus has the same value as during the previous clock. The encoder then communicates that information via an additional special code word to the far end. Both the TL3 and TL4 codes could encode such a 9th or 17th state.

Systems Benefits of Fault Tolerance

Consider an example system comprising multiple stacked integrated circuit devices interconnected using through-silicon via (TSV) technology. If this assembly contains 1024 TSVs, and each TSV has a fault probability of $1 \times 10^{-6}$ (one failure per million connections), the probability that the combined assembly does not have full connectivity is $(1 \times 10^{-6})1024$ or approximately $1.02 \times 10^{-3}$, or 1 in 1000.

Assuming that the 1024 connections are used in groups of four, and a fault-tolerant code permits continued operation if one of the four connections is failed, the probability that the combined assembly does not have full connectivity improves to approximately 1.5×10-9, or 1 in 650 million.

Enhanced TL3 Fault-Tolerant Code

In accordance with at least one embodiment of the invention, a variation of the previously described modulus-encoded code, herein called Fault-Tolerant TL3 or FTTL3, encodes three bits of data as ternary signals on groups of four wires. If any one of the signals is unavailable, as from a wire fault, the code continues to deliver three bits of data using signals on the remaining wires.

One embodiment incorporates a signal continuity test mode used, for example, at time of system initialization. This mode exercises each wire or TSV in the interconnection to identify wires or TSVs that have failed, and reports those failures to the encoding/decoding systems so that those signals may be bypassed or ignored during normal operation.

FTTL3 Encoding

The task of the encoder is to calculate a codeword upon receiving 3 bits (a, b, c). The encoder maintains additional state corresponding to the prior values of the three wires. It also receives as input s, indicating which wires are unbroken.

As an example, prior state p and sequence s may be defined as $$p=(p[0],p[1],p[2]) \; p_i \in \{0,1,2\} \quad \text{[Eqn. 1]}$$

$$s=(s[0],s[1]) \quad \text{[Eqn. 2]}$$

where s provides indices of the unbroken wires.

An updated state p is obtained by the encoding algorithm:

```
If c = 0 then,
    p[s[0]] := T₁(p[s[0]], a)
    p[s[1]] := (p[s[1]], b)
else
    if ab = 0 then
        p[s[a]] := (p[s[a], b)
    endif
endif
``` where $T_1$ is performed using the lookup table previously described. The updated p is emitted on the output wires and retained for use in the next encoding cycle.

FTTL3 Decoding

An example decoder for the FTTL3 code uses two variables p and q, corresponding to the previous and successor (i.e. present) state of the received input wires. As with the encoder, sequence s is an input indicating which wires are unbroken.

Input:

$$p=(p[0],p[1],p[2]) \; p_i \in \{0,1,2\} \quad \text{[Eqn. 3]}$$

$$q=(q[0],q[1],q[2]) \; q_i \in \{0,1,2\} \quad \text{[Eqn. 4]}$$

$$s=(s[0],s[1]) \quad \text{[Eqn. 5]}$$

Prior state p and a successor state q represent the remembered previous and current detected input wire values, respectively. For each new input wire values detected, the decoder performs the algorithm:

Output:

```
a := 1, b := 1, c := 1
Δ = (q[s[0]] - p[s[0]], q[s[1]]—[s[1]]) mod 3
m = weight(Δ)
Determine a ∈ {0,1} such that Δ[a] ≠ 0, set b: = Δ[a]
if m=0, do nothing.
    else if m=1, output (a, b, 1)
        else if m=2, set d := Δ[s[ā]]
        endif
    endif
    if a=0
        output (b, d, 0)
    else
        output (d, b, 0)
    endif
``` a, b, c are output as the received data values, and stored state q is updated to be equal to p Enhanced TL4 Fault-Tolerant Code In accordance with at least one embodiment, a further variation of the previously described fault-tolerant modulus-encoded code, herein called FTTL4, encodes four bits of data as ternary signals on groups of four wires. If one of the signals is unavailable, as from a wire fault, the code continues to deliver four bits of data using signals on the remaining three wires.

As with the previous example, at least one embodiment incorporates a signal continuity test mode used, for example, at time of system initialization. This mode exercises each wire or TSV in the interconnection to identify wires or TSVs that have failed, and reports those failures to the encoding/decoding systems. Normal operation may occur if each four wire group has at least three fault-free wires.

FTTL4 Encoding

The task of the encoder is to calculate a codeword upon receiving 4 bits (a, b, c, d). The encoder maintains additional state corresponding to the prior values of the four wires. It also receives as input s, indicating which wires are unbroken.

As an example, prior state p and sequence s may be defined as $$p=(p[0],p[1],p[2],p[3]) \; p_i \in \{0,1,2,3\} \quad \text{[Eqn. 6]}$$

$$s=(s[0],s[1],s[2]) \quad \text{[Eqn. 7]}$$

where s provides indices of the unbroken wires.

An updated state p is obtained by the encoding algorithm:

```
If ab = 0 then,
    p[s[NOR(a, b)]] ← T₁(p[s[NOR(a, b)]], c)
    p[s[2ā + a]] ← T₁(p[s[2ā + a]], d)
else
    if cd = 0 then
        p[s[c + 2d]] ← T₂(p[s[c + 2d]])
    endif
endif
``` where $T_1$ and $T_2$ are performed using the two lookup tables previously described. The updated p is then emitted on the output wires.

Decoding of the FTTL4 code follows the method described in the previous example.

Error Probability Reduction

If it is assumed that wire failures are independent, and occur with probability p, and that the interconnection between devices has M wires, the probability q that the interconnected devices fail due to the wire failures may be calculated as:

$$q=1-(1-p)^N \sim N \cdot p \text{ for small } p \quad \text{[Eqn. 8]}$$

If the FTTL3 code is used, 1 failure per 3 wire group may be tolerated, leading to:

$$q=1-((1-p)^3+3p(1-p)^2)^{N/3} \sim N \cdot p^2 \text{ for small } p \quad \text{[Eqn. 9]}$$

which is orders of magnitude smaller than the unencoded case, for small p.

Similarly, if the FTTL4 code is used, 1 failure per 4 wire group may be tolerated, leading to:

$$q = 1 - ((1-p)^4 + 4p(1-p)^3)^{\frac{N}{4}} \sim \frac{3}{2} N \cdot p^2 \text{ for small } p \quad \text{[Eqn. 10]}$$

which is orders of magnitude smaller than the unencoded case, for small p.

Power and SSO Behavior

A figure of merit (FOM) metric may be defined for driver power consumption and SSO noise generation per transmitted bit in the FTTL3 and FTTL4 codes, compared to non-fault-tolerant unterminated CMOS transmissions with the same peak-to-peak signal swings.

For power utilization, the metric is called P-FOM, and has been calculated to be approximately 0.41 for FTTL3 and 0.375 for FTTL4. For simultaneous switched output noise, the metric is called S-FOM and is 0.66 for FTTL3 and 0.5 for FTTL4.

Adaptive Wire Selection for Fault Tolerance

Figure 5:
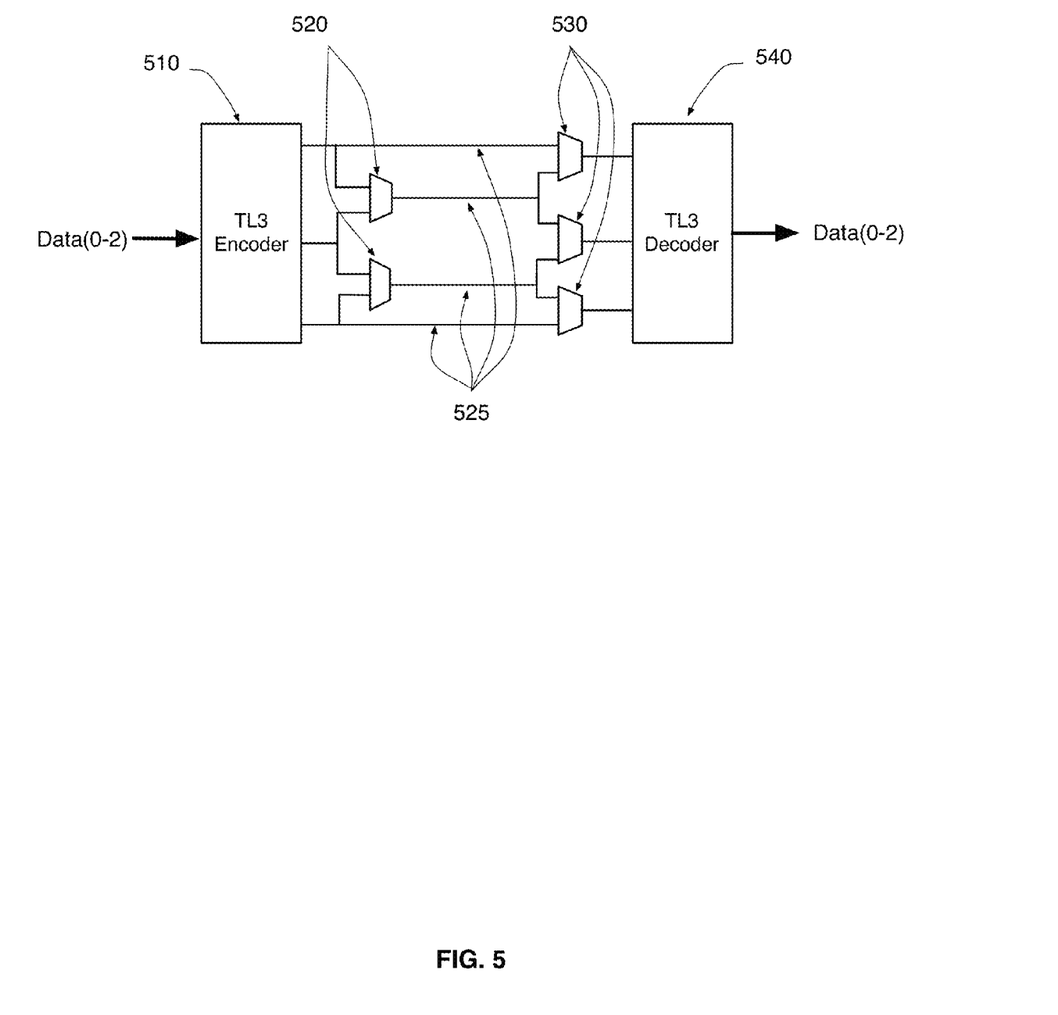
FIG. 5 is a circuit diagram of an embodiment adding fault tolerance to a TL3 coded system.

As illustrated in FIG. 5, fault tolerance may be added to a system using, as an example, standard TL3 coding with the addition of logic allowing code symbols to be steered to and from undamaged wire paths. Encoder 510 accepts Data(0-2) to produce a TL3 codeword of three ternary values. Multiplexers 520 steer these three signals onto three of the four communications wires 525, and multiplexers 530 steer the received signals to the three inputs of TL3 decoder 540. Thus, any one failed wire in 525 may be bypassed by appropriate setting of multiplexers 520 and 530.

As will be apparent to one familiar with the art, the example multiplexers are equivalent to, and thus may be replaced by digital logic between the encoder outputs and the output drivers and between the input line receivers and decoder inputs, or by an analog crossbar, switch, or transmission gates between the output drivers, input line receivers, and wires.

The examples presented herein illustrate the use of vector signaling codes for point-to-point or bussed chip-to-chip interconnection. However, this should not been seen in any way as limiting the scope of the described invention. The methods disclosed in this application are equally applicable to other interconnection topologies and other communication media including optical, capacitive, inductive, and wireless communications. Thus, descriptive terms such as "voltage" or "signal level" should be considered to include equivalents in other measurement systems, such as "optical intensity", "RF modulation", etc. and "wire" should be considered as representing any discrete and isolatable signal path or channel. As used herein, the term "signal" includes any suitable behavior and/or attribute of a physical phenomenon capable of conveying information. Such physical signals may be tangible and non-transitory.

We claim:

1. A system for data communications over a multiple signal wire communications channel, the system comprising:
    a fault detector configured to identify at least one failed signal wire from a plurality of wires of the communications channel, and to generate a set of indices identifying unbroken wires of the communications channel; and
    an encoder configured to receive a plurality of data bits and the set of indices identifying unbroken wires, and to transition a subset of the unbroken wires according to at least one transition-limiting function operating on a previous state of the subset of the unbroken wires and a subset of the plurality of data bits, the subset of the unbroken wires identified by one or more indices of the set of indices.

2. The system of claim 1, wherein the fault detector operates at system initialization.

3. The system of claim 1, wherein the plurality of data bits comprises three bits, and the communications channel comprises four signal wires including one failed signal wire and three unbroken wires.

4. The system of claim 1, wherein the plurality of data bits comprises four bits, and the communications channel comprises four signal wires including one failed signal wire and three unbroken wires.

5. The system of claim 1, further comprising a voltage regulator configured to set the signal level of at least one signal of the group of signals.

6. The system of claim 5, wherein the voltage regulator comprises at least one charge pump or current source controlled by the plurality of data bits.

7. The system of claim 6, wherein the voltage regulator further comprises at least one charge pump or current source controlled by a measurement of the regulated voltage output.

8. The system of claim 1, wherein the at least one transition-limiting function comprises a single transition-limiting function.

9. The system of claim 8, wherein the encoder is configured to check a first bit of the plurality of bits for a first condition that:
    if satisfied, transitions a pair of unbroken wires according to the single transition-limiting function; and
    if the first condition fails, the encoder is configured to check all remaining bits of the plurality of bits for a second condition that if satisfied, transitions a single unbroken wire according to the single transition-limiting function.

10. The system of claim 1, wherein the at least one transition-limiting function comprises a first transition limiting function and a second transition-limiting function.

11. The system of claim 10, wherein the encoder is configured to check a first pair of bits for a first condition that:
    if satisfied, transitions a pair of unbroken wires according to a first transition-limiting function, and
    if the first condition fails, the encoder is configured to check a second pair of bits for a second condition, the second pair of bits different than the first pair of bits, wherein if the second condition is satisfied, the encoder transitions a single unbroken wire according to a second transition-limiting function.

12. A method comprising:
    receiving a plurality of data bits;
    identifying at least one failed signal wire from a plurality of wires of a communications channel, responsively generating a set of indices identifying unbroken wires of the communications channel; and,
    transitioning a subset of the unbroken wires according to at least one transition-limiting function operating on a previous state of the subset of the unbroken wires and a subset of the plurality of data bits, the subset of the unbroken wires identified by one or more indices of the set of indices.

13. The method of claim 12, wherein the plurality of data bits comprises three bits, and the communications channel comprises four signal wires including one failed signal wire and three unbroken wires.

14. The method of claim 12, wherein the plurality of data bits comprises four bits, and the communications channel comprises four signal wires including one failed signal wire and three unbroken wires.

15. The method of claim 12, further comprising setting a signal level of at least one signal of the group of signals using a voltage regulator.

16. The method of claim 12, wherein the at least one transition-limiting function is implemented using a lookup table (LUT).

17. The method of claim 12, wherein the at least one transition-limiting function comprises a single transition-limiting function.

18. The method of claim 17, further comprising checking a first bit of the plurality of bits for a first condition that:
    if satisfied, transitioning a pair of unbroken wires according to the single transition-limiting function; and
    if the first condition fails, checking all remaining bits of the plurality of bits for a second condition that if satisfied, transitioning a single unbroken wire according to the single transition-limiting function.

19. The method of claim 12, wherein the at least one transition-limiting function comprises a first transition limiting function and a second transition-limiting function.

20. The method of claim 19, further comprising checking a first pair of bits for a first condition, and if the first condition is satisfied, transitioning a pair of unbroken wires according to a first transition-limiting function, and if the first condition fails, checking a second pair of bits for a second condition, and if the second condition is satisfied, transitioning a single unbroken wire according to a second transition-limiting function.

\* \* \* \* \*

UNITED STATES PATENT AND TRADEMARK OFFICE
CERTIFICATE OF CORRECTION

PATENT NO. : 9,564,994 B2
APPLICATION NO. : 14/498957
DATED : February 7, 2017
INVENTOR(S) : Amin Shokrollahi and Roger Ulrich Page 1 of 1

It is certified that error appears in the above-identified patent and that said Letters Patent is hereby corrected as shown below:

On the Title Page

Item (54) and in the Specification, Column 1, Lines 1-3, change "FAULT TOLERANT CHIP-TO-CHIP COMMUNICATION WITH ADVANCED VOLTAGE" to -- FAULT TOLERANT CHIP-TO-CHIP COMMUNICATION WITH ADVANCED VOLTAGE REGULATOR --

Signed and Sealed this
Twenty-third Day of May, 2017

Michelle K. Lee
*Director of the United States Patent and Trademark Office*